United States Patent
Darcy

(10) Patent No.: US 9,298,732 B2
(45) Date of Patent: Mar. 29, 2016

(54) SEARCHING CLOUD-BASED DISTRIBUTED STORAGE RESOURCES USING A SET OF EXPENDABLE PROBES

(75) Inventor: Jeffrey Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 335 days.

(21) Appl. No.: 12/893,737

(22) Filed: Sep. 29, 2010

(65) Prior Publication Data

US 2012/0078948 A1 Mar. 29, 2012

(51) Int. Cl.
*G06F 17/30* (2006.01)

(52) U.S. Cl.
CPC .... *G06F 17/30197* (2013.01); *G06F 17/30094* (2013.01)

(58) Field of Classification Search
CPC ..................... G06F 17/30197; G06F 17/30094
USPC .......................................................... 707/747
See application file for complete search history.

(56) References Cited

U.S. PATENT DOCUMENTS

| 2008/0235746 | A1* | 9/2008 | Peters et al. ................... 725/111 |
| 2010/0205282 | A1* | 8/2010 | Takeda et al. .................. 709/220 |
| 2011/0153634 | A1* | 6/2011 | Chu ........................ H04L 67/16 707/764 |
| 2011/0282945 | A1* | 11/2011 | Thyni et al. .................... 709/204 |

OTHER PUBLICATIONS

Stoica et al., "Chord: A Scalable Peertopeer Lookup Service for Internet Applications", MIT Laboratory for Computer Science, SIGCOMM'01, Aug. 27-31, 2001, San Diego, California, USA.*
Singh et al., "Agyaat: mutual anonymity over structured P2P networks", College of Computing, Georgia Institute of Technology, Atlanta, Georgia, USA, Internet Research, vol. 16 No. 2, 2006, pp. 189-212, Emerald Group Publishing Limited.*
Jeffrey Darcy, "Systems and Methods for Cloud-Based Directory System Based on Hashed Values of Parent and Child Storage Locations," U.S. Appl. No. 12/893,612, filed Sep. 29, 2010.
James Michael Ferris, "Systems and Methods for Generating Optimized Host Placement of Data Payload in Cloud-Based Storage Network", U.S. Appl. No. 13/118,075, filed May 27, 2011.
Jeffrey Darcy, "Systems and Methods for Monitoring Files in Cloud-Based Networks", U.S. Appl. No. 12/893,388, filed Sep. 29, 2010.
Jeffrey Darcy, "Systems and Methods for Dynamically Replicating Data Objects Within a Storage Network", U.S. Appl. No. 12/872,022, filed Aug. 31, 2010.

(Continued)

*Primary Examiner* — Mariela Reyes
*Assistant Examiner* — Mohsen Almani
(74) *Attorney, Agent, or Firm* — Lowenstein Sandler LLP

(57) ABSTRACT

Embodiments relate to searching a cloud-based file storage system using a set of expandable probes. Platforms and techniques are provided to search for a file whose location in cloud storage resources is recorded in a consistent hash ring structure. In a hash ring, a file name can generate a hash output corresponding to a position around a circle. The closest clockwise node to that location can contain the file itself, or a link to another location containing or leading to the file. When a link has become obsolete and no longer points to the file, it may be necessary to search for that file. Embodiments perform a graduated search for the missing file, starting one node from the original node, then trying two adjacent nodes, then four adjacent nodes and so forth in expanding fashion, until the file is found or the hash structure is exhausted.

23 Claims, 11 Drawing Sheets

(56) References Cited

OTHER PUBLICATIONS

James Michael Ferris, "Systems and Methods for Stage Data Migration Between Data Sources and Cloud-Based Storage Network", U.S. Appl. No. 13/037,183, filed Feb. 28, 2011.

James Michael Ferris, "Systems and Methods for De-Populating Cloud Data Storage", U.S. Appl. No. 13/036,977, filed Feb. 28, 2011.

James Michael Ferris, "Systems and Methods for Migrating Data Among Cloud-Based Storage Networks via a Data Distribution Service", U.S. Appl. No. 13/037,215, filed Feb. 28, 2011.

James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.

James Michael Ferris, "Systems and Methods for Establishing Upload Channels to a Cloud Data Distribution Service" U.S. Appl. No. 13/037,230, filed Feb. 28, 2011.

James Michael Ferris, "Methods and Systems to Automatically Extract and Transport Data Associated with Workload Migrations to Cloud Networks", U.S. Appl. No. 13/116,599, filed May 26, 2011.

James Michael Ferris, "Systems and Methods for Cloud Data Deployment Based on Preferential and/or Existing Subscription Relationships", U.S. Appl. No, 13/117,331, filed May 27, 2011.

James Michael Ferris, "Methods and Systems for Data Compliance Managemnet Associated with Cloud Migration Events", U.S. Appl. No. 13/118,123, filed May 27, 2011.

James Michael Ferris, "Systems and Methods for Determining Consistencies in Staged Replication Data to Improve Data Migration Efficiency in Cloud Based Network", U.S. Appl. No. 13/117,235, filed May 27, 2011.

\* cited by examiner

SEARCHING CLOUD-BASED DISTRIBUTED STORAGE RESOURCES USING A SET OF EXPENDABLE PROBES

FIELD

The present teachings relate to systems and methods for searching a cloud-based distributed storage resources using a set of expandable probes, and more particularly to platforms and techniques for performing a graduated search for missing files in a cloud-based distributed file storage system, using expandable sets of probes to search the nodes of a consistent hash structure.

BACKGROUND OF RELATED ART

Hash structures are used in computer systems to map identifying values, or keys, to their associated values or storage locations storing those values. A hash function is used to transform the key into the index of an array element where the associated value or pointer to that value is stored. When items in the hash structure are removed or deleted, the hash structure usually undergoes a rehash, whereby existing items in the hash structure are mapped to new locations. Hash structures can be used in cloud-based networks to arrange distributed storage schemes, in which mappings in the hash structure can contain or point to stored data objects, such as files that can be used by applications running in the cloud.

"Consistent hashing" can be implemented such that the addition or removal of one slot does not significantly change the mapping of keys to locations. In particular, consistent hashing involves associating a real angle to stored items to effectively map the item to, for example, a point on the circumference of a circle. In addition, available machines or servers are mapped to locations around the circle. The machine or server on which the item is to be stored is chosen by selecting the machine at the next highest angle along the circle after the item. If a storage location on the machine becomes unavailable, then the angles mapping to the location are removed and requests for files that would have mapped to the unavailable location are now mapped to the next available storage location.

However, consistent hashing can be problematic in situations in which a user or computer program requests to access a file that has been moved, renamed, or deleted without the user or computer program having the necessary data to determine the change. As such, finding and accessing the file can take more time and can lead to system hardware or software problems, faults, or other errors. Further, hashing in cloud-based networks can be problematic when multiple entities have access to move, rename, or delete files stored on devices of the cloud-based network.

In cases where a file has been altered in a distributed storage system using a consistent hash structure, attempts can be made to locate the file by traversing the last known links pointing to that file in the hash structure. When those attempts fail to locate the requested file, it becomes necessary to initiate a search for that file. In cases, the removal or insertion of storage servers may have altered or offset the position of links to the file in the hash structure. In the simplest case, the removal or insertion of a single storage server and/or other node in the hash structure can shift the location of the hash node corresponding to the file by one position. In that case, a check of the closest adjacent node (in the clockwise or other direction) can sometimes locate the missing file with little additional processing burden.

While unexpected or unrecorded node shifts of one position may sometimes be the most likely cause of a missing or misplaced file, in cases the checking of the next-closest node may not locate the requested file. In those cases, it becomes necessary to search the remaining (unchecked) nodes of the hash structure, such as the remaining nodes in a circular hash ring. In such instances, it is possible to search or probe all remaining nodes of the ring at one time, to be sure of locating the file (as long as it remains present in the hash structure and corresponding cloud storage resources). However, transmitting a significant number of simultaneous or near-simultaneous probes or search requests to all remaining nodes in a hash structure can impose significant communications and processing overhead.

In other cases, a user can choose to search the hash ring or other hash structure by traversing the ring one node at a time, proceeding for instance from the last node that was checked in a clockwise or counter-clockwise direction until the file is found (as long as it remains in the hash structure and corresponding cloud storage resources). However, traversing a hash ring or other hash structure one node at a time can involve performance penalties in terms of search lag, and in general can not be expected to locate the requested file in a search checking any less than ½ of the remaining nodes, on average.

Therefore, it may be desirable to provide systems and methods for searching a cloud-based distributed storage resources using a set of expandable probes, in which file searches or probes can proceed in a graduated manner, where, as each span checked by a current generation or set of the probes is determined not to contain the desired file, the next iteration of probes will increase in size or span, for instance exponentially.

DESCRIPTION OF EMBODIMENTS

Figure 1:
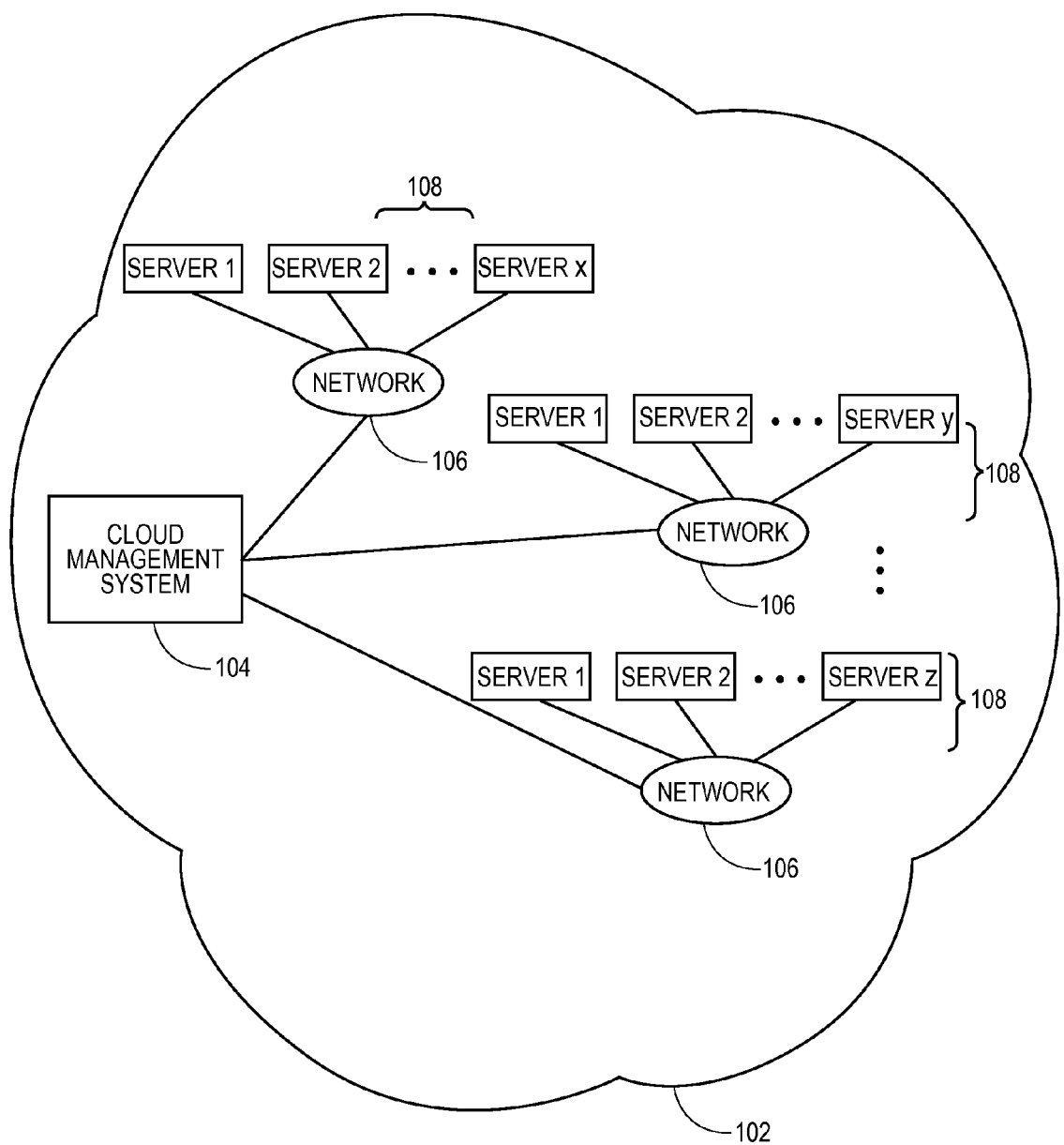
FIG. 1 illustrates an overall cloud system architecture in which various embodiments of the present teachings can be practiced.

Embodiments of the present teachings relate to systems and methods for searching a cloud-based distributed storage resources using a set of expandable probes. In particular, embodiments relate to platforms and techniques for generating and conducting search operations to locate missing files stored in a cloud-based distributed storage architecture, in which the locations of files (or files themselves) are stored in the nodes of a consistent hash structure such as a hash ring. The hash structure in combination with the cloud-based network can allow for a distributed system of file storage and retrieval by one or more users of the cloud and/or applications in the cloud. For example, an operator of the cloud-based network can insert files into available storage devices of the cloud, such as storage servers, RAID (redundant array of inexpensive disks) arrays, data warehouses and/or other storage resources on a dynamic and/or distributed basis while using the hash structure to maintain locations of the files. In embodiments, users or computer hardware or software can request access to the file whose contents and/or location is mapped to the hash structure. In aspects, when a file whose last known or recorded location based on the corresponding node in the hash structure can not be located at the location indicated by the hash structure, a search can be undertaken to locate that file using an expandable set of search probes whose span, measured by the number of nodes which are simultaneously or near-simultaneously examined to attempt to find the file or other data object, can increase for each generation over a set of search iterations. In aspects, the span of the expandable set of probes can expand on an exponential basis, and/or can expand using other functions or mathematical orders.

In embodiments, specifically a memory address of the file can be allocated to a storage server or other storage device that is correspondingly mapped to the hash structure. In aspects, the users can be a set of end users accessing, via a set of instantiated virtual machines in a cloud-based network, files associated with application, service, and/or other resources provided by one or more vendors, such as independent service vendors (ISVs) or others.

Embodiments described herein can be implemented in or supported by a cloud network architecture, in which files and/or other data objects requested by one or more users can be stored to various distributed storage resources of the cloud. As used herein, a "user" can refer a person, customer, subscriber, administrator, corporation, organization, or other entity accessing files and/or devices storing the files in the cloud-based network. In embodiments, the user can operate or manage computer software, hardware, services, and/or other resources that can access files and/or devices storing the files in the cloud-based network. Further, as used herein, a "cloud" can in regards comprise a collection of resources that can be invoked to instantiate a virtual machine, process, or other resource for a limited or defined duration, as described herein.

As used herein, the "storage devices" can be hardware such as, for example, servers, device drivers, storage such as hard drives, virtual memory, databases, RAID arrays, hard disks, optical discs such as CD-ROM, DVD-ROM and Blu-ray discs, random access memory (RAM) and other memory, processors, multimedia cards, magnetic tape, and/or other storage media or resources hosted in the cloud-based network. The storage devices can be accessed by users or by software or applications independent from or associated with resources of the cloud-based network. Resources in the cloud-based network can include any hardware, software, and/or communications resources, such as ports or channels provided to a virtual machine or other machine or process in the cloud. Resources can likewise include services, such as Web-based services deployed in the cloud, for example security or identity management services and/or other resources.

As used herein, a "hash structure" can be any data structure, model, object, and/or encoding that uses a hash function to map keys or other inputs to corresponding nodes on that structure, which nodes can either contain the desired data object itself and/or a link or other pointer to the desired data object. In embodiments, the output of the hashing process can comprise an angular value produced by hashing the name of a file that points to a location around a ring, with the closest next node (e.g. in a clockwise direction) then storing an address, link, and/or other location of a file or other data object stored on an associated storage device hosted in the cloud. In embodiments, the closest next node pointed to by the hashed angular value can also or instead itself contain the file or other data object, in memory or other storage associated with the hash structure.

One or more hash structures used herein can be implemented as a consistent hashing scheme, whereby the address locations storing a desired file or other data object are mapped and allocated to mapped storage devices via a circular or ring-based hash structure. One or more users or entities can access the hash structures to overwrite, change, delete, update, reformat, or otherwise modify or manipulate keys or values associated with the hash structures, such as file names or file versions. It should be appreciated that various hash functions known to persons skilled in the art can be employed to map keys, such as requested file names, to the associated angular values or other pointers to hash nodes associated with stored files. In embodiments, the hash structures can be employed in one or more cloud-based networks.

FIG. 1 illustrates an overall cloud system architecture, in which various embodiments of the present teachings can be practiced or implemented. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
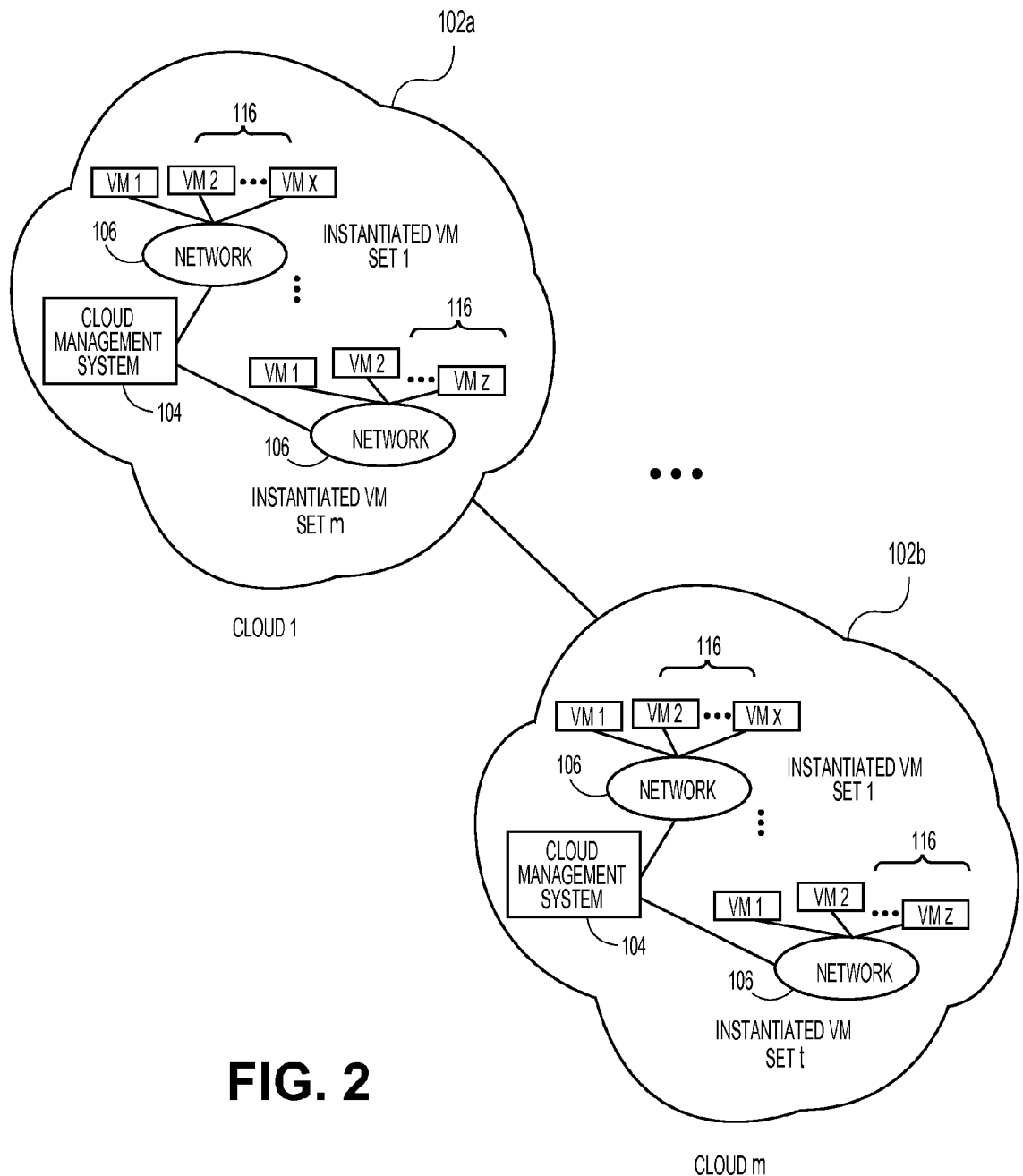
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102a, 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102a, 102b hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
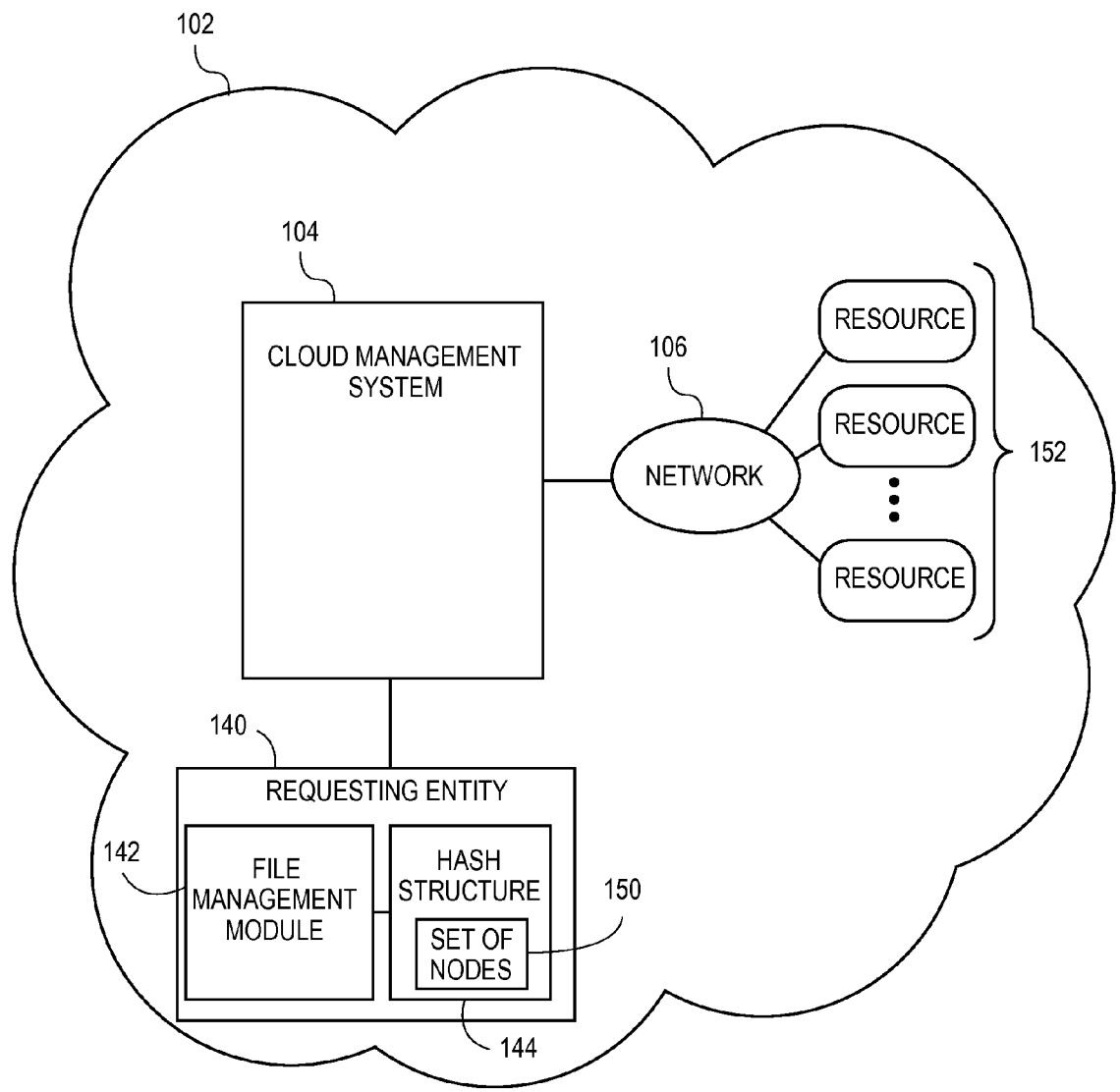
FIG. 3 illustrates an exemplary network configuration that can be used in systems and methods for searching a cloud-based file storage system using a set of expandable probes, according to various embodiments.

FIG. 3 illustrates an exemplary network configuration that can be used in systems and methods for managing file modifications in cloud-based networks. In embodiments as shown, the cloud management system 104 can interface with a requesting entity 140, and with a set of storage resources 152 of the cloud 102 via the network 106. In aspects, the requesting entity can comprise a physical or virtual client machine operated by a user or users, such as a personal computer, cellular telephone, and/or other wired or wireless network-enabled device. The requesting entity 140 can request files stored on the set of storage resources 152 of the cloud 102. In embodiments, the set of storage resources 152 can be servers, virtual machines, and/or other storage resources associated with the cloud 102.

In aspects, the requesting entity 140 can comprise a file management module 142 that can be configured to interface with a hash structure 144 that can map keys to their associated values. In embodiments, candidate storage locations of files stored on the set of storage resources 152 can be mapped to nodes stored on or associated with the hash structure 144. In embodiments, the hash structure 144 can be implemented using consistent hashing, such as a ring-based hash structure, although other hashing techniques and structures are envisioned. An operator of the cloud 102 can insert files into any available storage resource a dynamic and/or distributed basis while using the hash structure 144 to maintain locations of the files.

It should be appreciated that the hash structure 144 or a copy thereof can be implemented or stored on other resources of cloud 102 such as, for example, the cloud management system 104. It should further be appreciated that the file management module 142 can be implemented on other hardware and/or software components configured to interface with the other components and entities described herein. Further, it should be appreciated that the file management module 142 can be configured to interface with additional clouds (not shown in figures) and associated resources, such as virtual machines, of the additional clouds.

In embodiments, the requesting entity 140 can be a user, owner, administrator, company, software program or application, service, or other entity or resource who can submit a request to access or retrieve a file stored on the set of storage resources 152 of the cloud 102. For example, a user can submit a file request to access or retrieve a file stored on a virtual machine 116 in the cloud 102. In embodiments, the file management module 142 can determine, from the file request, a candidate storage address for the file that can be mapped to the hash structure 144 and allocated to a storage device 306 also mapped to the hash structure 144. The file management module 142 can be configured to communicate with the cloud management system 104, the set of storage resources 152, the hash structure 144, and/or other resources of the cloud 102.

According to the present embodiments, the file management module 142 can track and manage location histories of files via file links mapped on the hash structure 144. In embodiments, the file links can point to storage locations of the storage devices 306 on which the files are stored, such as, for example, a uniform resource locator (URL). Further, the storage devices 306 themselves can be mapped to the hash structure 144. In embodiments, hash structure, node storage and associated access techniques such as those described in co-pending U.S. application Ser. No. 12/893,388 entitled "SYSTEMS AND METHODS FOR MONITORING FILES IN CLOUD-BASED NETWORKS," filed of even date herewith and having the same inventor as this application and assigned or under obligation of assignment to the same entity as this application, which application is incorporated herein in its entirety by reference, can be used to manage and store files in the associated hash structure 144.

In operation, the file management module 142 can examine a file access request from the requesting entity 140 to determine a node on the hash structure 144 to which that file and/or other data object is mapped. For example, the file management module 142 can use a hash algorithm to generate an angular value on the hash structure 144 as a function of a name of the file. The closest node, for instance in a clockwise (or counterclockwise or other) direction, to that angular value can store an associated value for a candidate storage location in which the desired file is stored. It should be appreciated that other key generation and value determination algorithms are envisioned. In the regular course of retrieval processing, the requested file and/or other data object can be expected to be found directly or indirectly (e.g. by following links) from the corresponding node.

However, in cases the file management module 142 may be unable to locate the requested file from the expected location based on the hash structure 144. The cause of the missing or misplaced file can relate to a number of events, such as for example the removal of one or more servers from the set of storage resources 152, the addition of one or more servers from the set of storage resources 152, the corruption of the hash structure 144 itself, and/or other events or factors. In cases where the requested file is not located at the last known location via hash structure 144 and associated logic, it may be necessary to carry out search operations on the hash structure 144 and/or corresponding storage sites in the set of storage resources 152, according to various embodiments as now described.

Figure 4A:
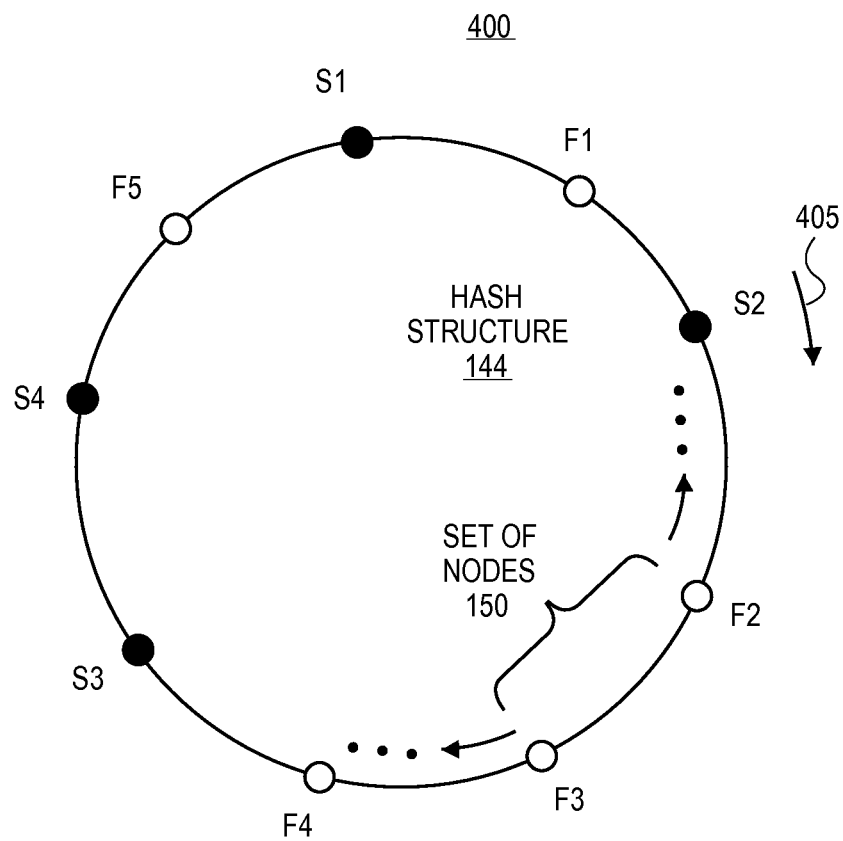
FIGS. 4A-4F illustrate a hash structure and illustrative processing using successive sets or generations of expandable probes to locate a missing file in cloud-based distributed storage resources, according to various embodiments.

Referring to FIG. 4A, depicted is a exemplary mathematical space 400 in which a hash structure 144 can be encoded or constructed to allocate and store files to storage resources using consistent hashing, and in which space 400 search operations according to embodiments can be conducted. As shown in FIG. 4A, the mathematical space 400 can be a circle with a radius of 1, however, it should be appreciated that the mathematical space 400 can comprise different spaces. The mathematical space 400 can comprise files and a plurality of servers or other storage resources mapped to a set of nodes 150 mapped to points on the circle using a consistent hash function. For example, as shown in FIG. 4A, files F1-F5 and servers S1-S4 are mapped as points on the circle of the mathematical space 400. Further, each of the files F1-F5 can be allocated to the closest server S1-S4 moving clockwise around the circle (as indicated by arrow 405) through the set of nodes 150. For example, as illustrated file F5 is allocated to server S1, file F1 is allocated to server S2, and files F2-F4 are allocated to server S3.

In instances where the node in set of nodes to which the hash function has directed the file management module 142 to locate the requested file does not contain or properly point to the requested files, search operations as illustrated in FIGS. 4B-4E can be initiated and carried out by file management module 142 and/or other logic. According to embodiments, in general, the file management module 142 can generate and employ an expandable set of probes 146 which can be transmitted or communicated to one or more target nodes in the set of nodes 150 to search, probe, examine, and/or otherwise check the set of nodes 150 in an increasing, progressive, or expanding manner to locate the missing file and/or other data object.

Figure 4B:
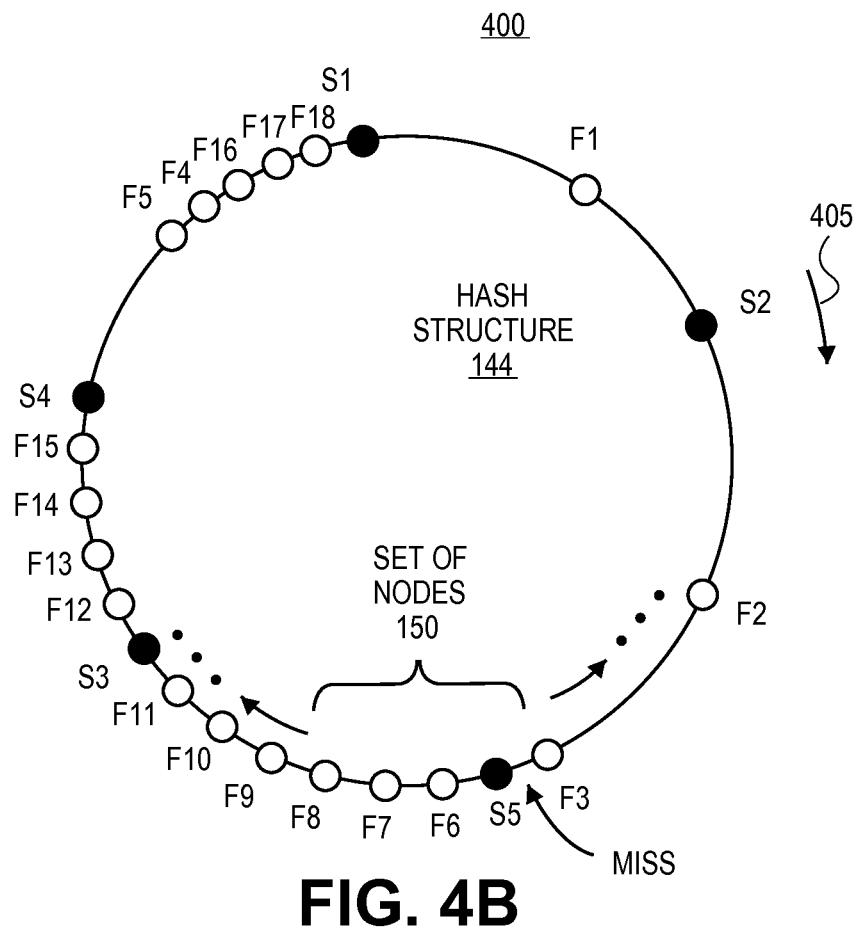
Figure 4C:
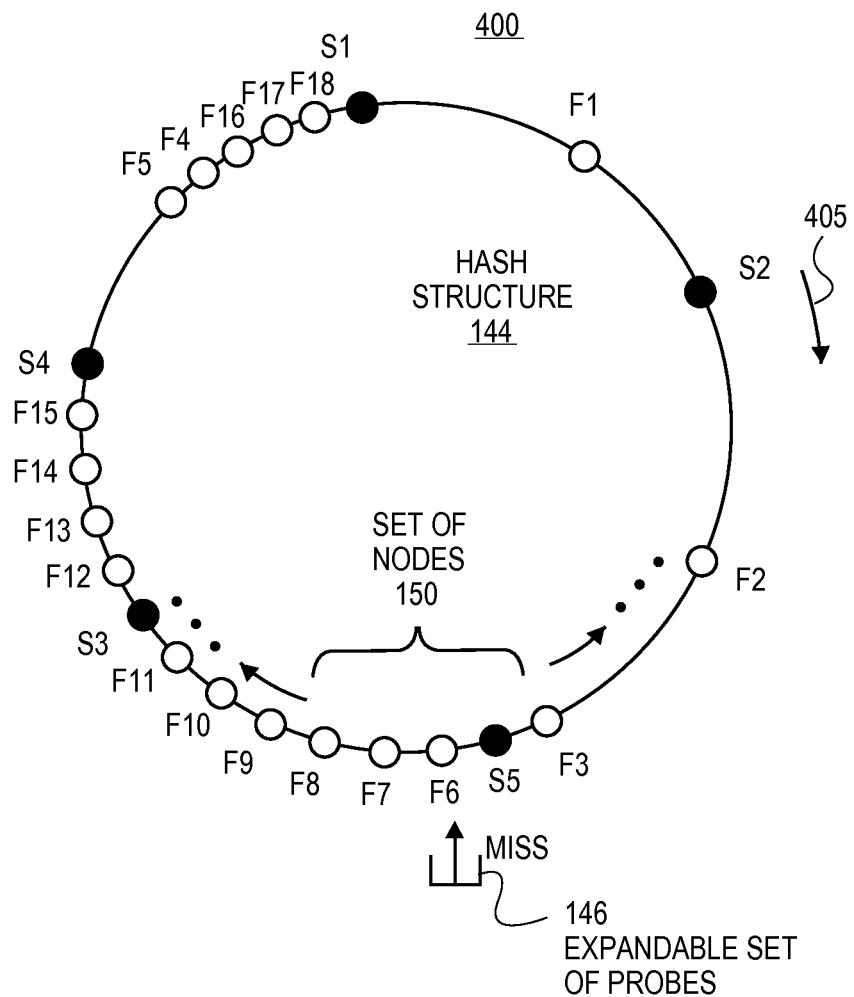

In embodiments, and as for instance shown in FIG. 4B, an initial attempt at retrieving a requested file can miss or file to locate a desired file, depicted merely for illustration as "F4." In aspects, the requested file (F4) may be missing or not located in the location indicated by the node corresponding to the file F4, due to the relocation of file F4 to a different server from the original server (merely illustratively, S2). The movement of file F4 to a different server or other location can have taken place without a corresponding update to the hash structure 144, thereby leading to an attempt to retrieve the requested file (F4) from an address or location on the original storage resource (server S2).

Figure 4D:
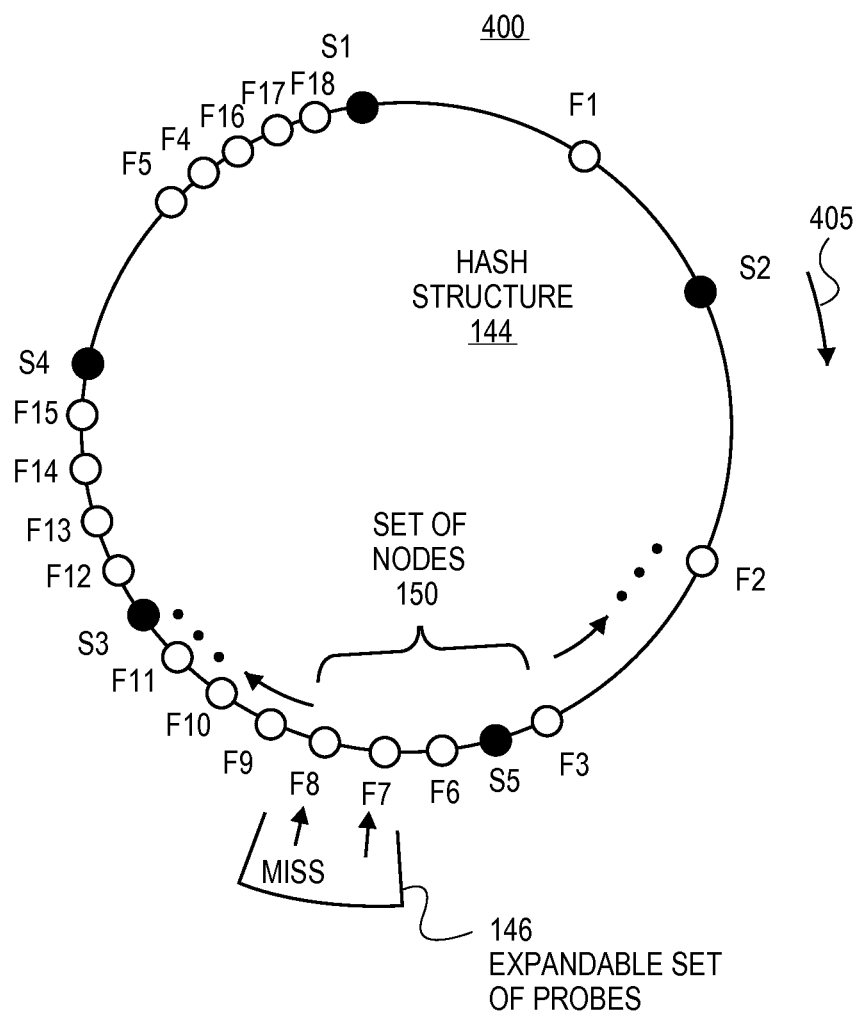

In response to determining that the requested file (F4) has not been located at its last known or recorded location as indicated by the hash structure 144, the file management module 142 can initiate file searching operations using an expandable set of probes 146. As illustrated for instance in FIG. 4C, the expandable set of probes 146 can be initiated by file management module 142 and/or other logic to comprise a single or one-node probe. The initial, single-node probe can be configured to examine the next adjacent node to the node at which the requested file (F4) was last known or recorded to be located, which in the illustration can be the node corresponding to file F6. In aspects, at times or under certain circumstances, the shifting of a node by one place due to the deletion of a file or server can represent the most likely cause of a missing file. In aspects, probing the single next-closest node (whether in a clockwise, counter-clockwise, or other direction or jump) can thereby represent the attempt to locate the file through the most likely node to now contain or point to the file. However, in aspects the requested file (F4) may be shifted or relocated to other locations or due to other reasons, and not reside in the closest next node in the set of nodes 150. Since this file identifier does not match the requested file (F4) in the illustrated search operations, the file management module 142 and/or other logic can proceed to expand the expandable set of probes 146 in an attempt to locate the requested file (F4) using an increasing number of probes of increasing or progressive span. As shown in FIG. 4D, the next generation or iteration of the expandable set of probes 146 can be doubled to span or encompass the next two (clockwise, or counter-clockwise or other) nodes adjacent to the last node (the F6 node) that was checked.

Figure 4E:
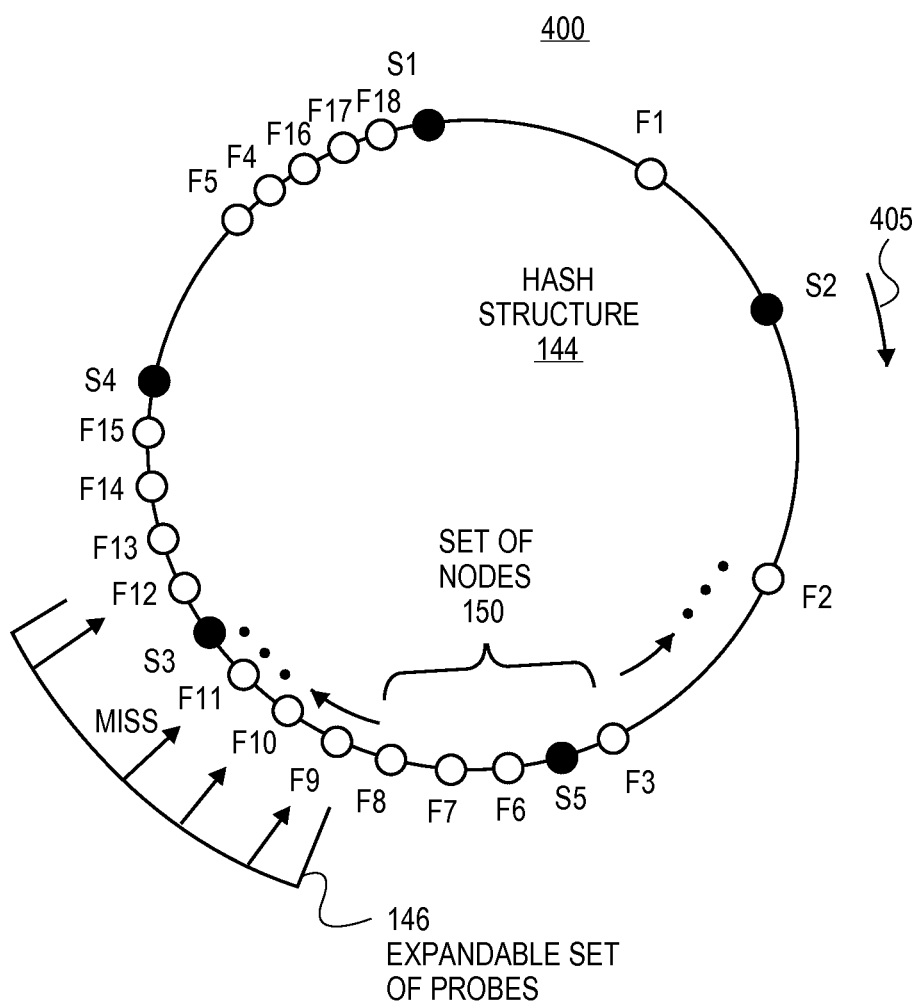
Figure 4F:
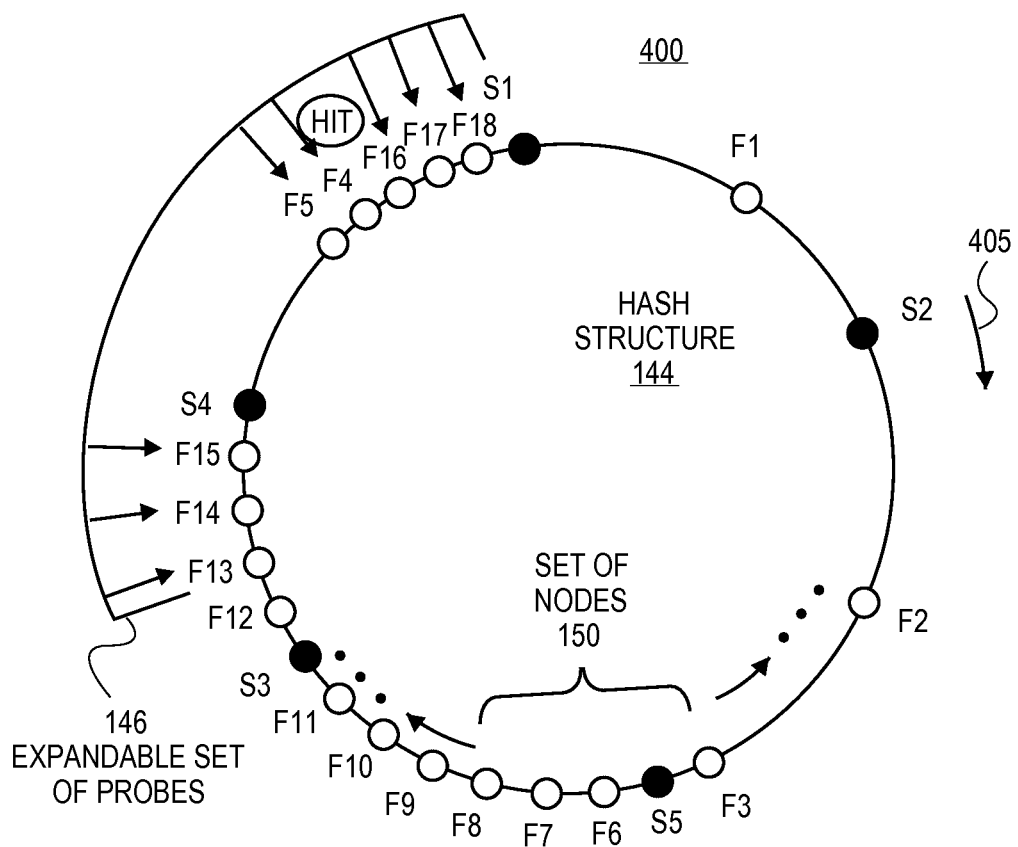

In aspects as shown, in the event where the requested file (F4) is likewise not found within the current generation or iteration of the expandable set of probes 146, the file management module 142 and/or other logic can increase the expandable set of probes 146 again as shown in FIG. 4E, for instance to double the span of the expandable set of probes 146, to a total of four nodes. In cases where, as shown, the examination of that subset of the set of nodes 150 also fails to locate the requested file, the file management module 142, as shown in FIG. 4F, can again increase the span of the expandable set of probes 146, for instance by doubling the span of the expandable set of probes 146 to eight nodes. In illustrative embodiments as shown, that generation or iteration of the expandable set of probes 146 can locate the requested file (F4), in the instance shown as being hosted or located on a different server (server S4) compared to the last known or recorded location of that file. The file management module 142 can then retrieve the requested file (F4), and transmit that file to the requesting entity 140. The file management module 142 can also perform cleanup operations on the hash structure 144, to insert the correct location of the located file (F4) into the set of nodes 150 using a consistent hashing scheme, as noted.

In aspects, increasing the span or number of nodes being probed or examined during search operations can increase the probability of locating the file compared to transmitting or activating a smaller number of probes. Conversely, by increasing the span of the expandable set of probes 146 in a regular progression, can increase the span of nodes being searched without necessarily saturating the communications or processing bandwidth being used to carry out the searching operations. In embodiments, as noted the expandable set of probes 146 can be increased by doubling the span of the expandable set of probes 146 after each search iteration, starting on a next-closest node to the node last examined. In aspects, the doubling of the expandable set of probes 146 produces an exponential increase in the span or width of the hash structure 144 being search, probed or examined. In embodiments, other increases or adjustments to the expandable set of probes 146 can be carried out. For instance, in embodiments, the expandable set of probes 146 can be increased by an amount generated by a linear or algebraic function. In embodiments, the function by which the expandable set of probes 146 is increased can be a combination of linear, algebraic, and/or exponential functions or values. In embodiments, it may also be noted that the function by which the file management module 142 causes the expandable set of probes 146 to expand can be dynamic and change over time, for instance, to speed up or slow down the rate at which the expandable set of probes 146 is growing in span. Other functions, calculations, iterations and adjustments to the expandable set of probes 146 can be made. For instance, in embodiments, the file management module 142 can cause the expandable set of probes 146 to start the next iteration or generation of probes at a different point than the next-closest node to the node that was last examined, for example, skipping to a half-way point around the hash structure 144 to align the expandable set of probes 146 to a node on the other side of the hash structure 144. Other calculations, progressions, expressions, and rules can be used to generate and update the expandable set of probes 146 to examine the set of nodes 150 in an increasing manner.

Figure 5:
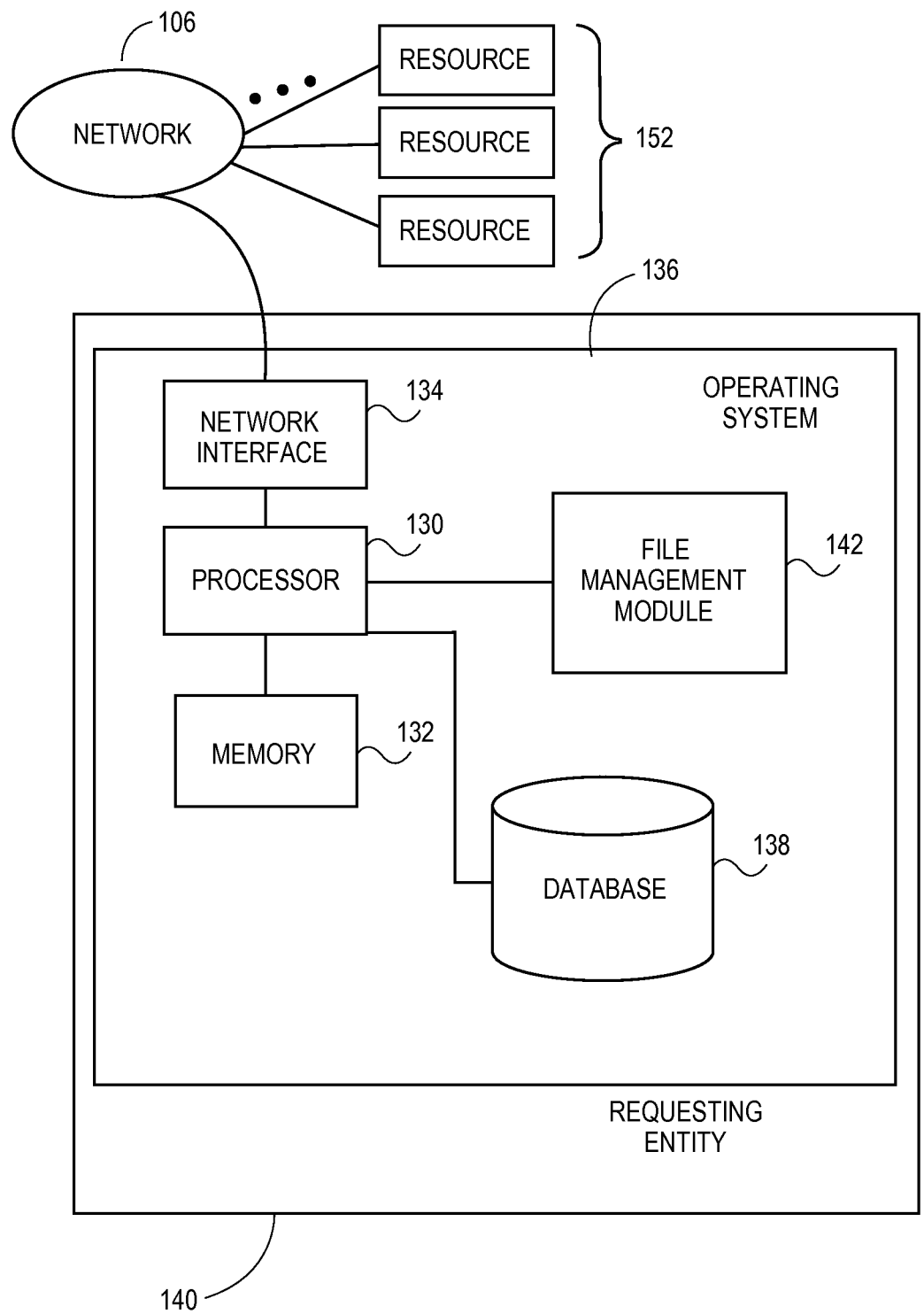
FIG. 5 illustrates an exemplary hardware configuration for a requesting entity that can comprise a client or other host system, according to various embodiments.

FIG. 5 illustrates an exemplary diagram of hardware and other resources that can be incorporated in or used by a requesting entity 140, configured to communicate with the hash structure 144, set of storage resources 152, and other storage and network resources via one or more networks 106 or other connections, according to embodiments. In embodiments as shown, the requesting entity 140 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138, the file management module 142, the hash structure 144 and other resources to execute control logic, manage search and retrieval operations of files and/or other data objects stored in the set of storage resources 152, as described herein, and control the operation of other resources in cloud 102. Other configurations of requesting entity 140, associated network connections, and other hardware and software resources are possible. In embodiments, it may be noted that the cloud management system 104 can comprise the same, similar, and/or different hardware, software, and other computing resources as the requesting entity 140.

Figure 6:
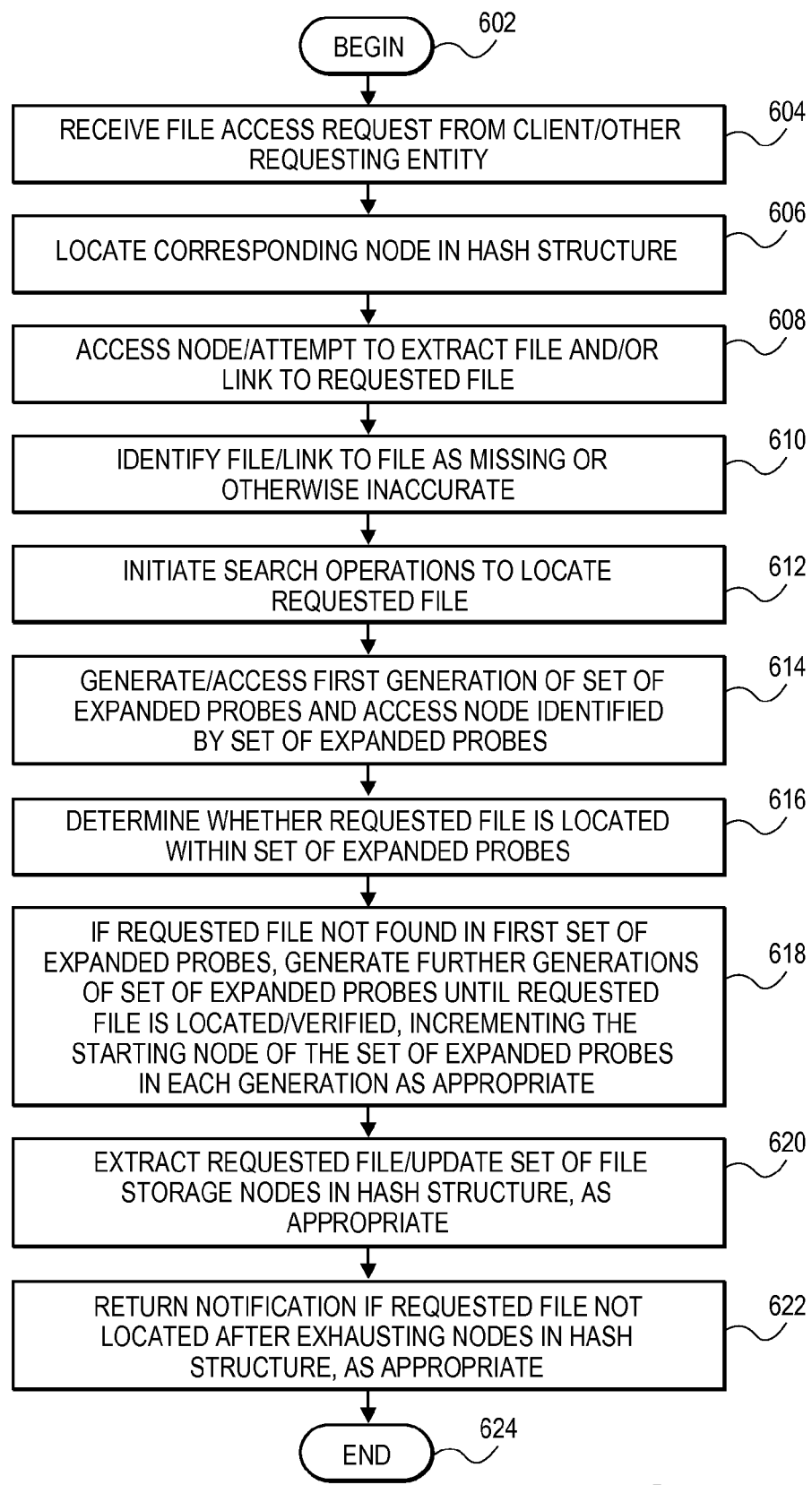
FIG. 6 illustrates a flowchart for managing file modifications in cloud-based networks, according to various embodiments.

FIG. 6 illustrates a flowchart for overall file searching using an expandable set of probes in a consistent hashing scheme, according to various embodiments. In 602, processing can begin. In 604, the file management module 142 and/or other logic can receive a file access request from a requesting entity 140, such as a user operating a personal computer, an administrator operating a console or server, an automated service, and/or other entities, operators, logic, and/or services. In 606, the file management module 142 can locate a node in the set of nodes 150 encoded in the hash structure 144 corresponding to the requested file. For instance, the name of the requested file can be hashed to an angular location on the circular ring of the hash structure 144, and the closest clockwise node can be identified as the node corresponding to the requested file. In 608, the file management module 142 can access the hashed node corresponding to the requested file to attempt to extract the file from the node itself, and/or to link to the requested file via additional links stored in or pointed to by the located node. In embodiments, storage and access techniques such as those described in the aforementioned co-pending U.S. application Ser. No. 12/893,388 entitled "SYSTEMS AND METHODS FOR MONITORING FILES IN CLOUD-BASED NETWORKS," can be used to attempt to locate the requested file. In embodiments, other access and/or file management techniques can be used to attempt to locate or retrieve the requested file. In 610, the requested file and/or link to the requested file can be identified and/or classified as missing or otherwise inaccurate, obsolete, and/or invalid after exhausting initial attempts at finding the file, or after those attempts have been determined to yield no meaningful possibility of finding the file.

In 612, search operations according to platforms and techniques described herein can be initiated to locate the requested file. In embodiments, it may be noted that the initial attempt to locate the file in 610 can be conducted based on or using links that are known or stored in the hash structure 144 as having been associated with the requested file in the past. According to embodiments, In search operations as initiated in 612, the search algorithms may in regards not be based or depend or stored links or pointers to the requested file. In 614, the file management module 142 can file management module 142 can generate, retrieve, and/or otherwise access a first generation or configuration of the expandable set of probes 146, for instance by retrieving those probes and/or associated data from computer readable storage medium 138, and/or other local or remote storage. In aspects, the first generation or iteration of the expandable set of probes 146 can consist of a probe spanning or encompassing single node. In aspects, the file management module 142 can use the first-generation probe to examine the node in the set of nodes 150 that is adjacent to the node, and/or last or ultimate node after following any intermediate links, that was deemed to contain the requested file but which did not successfully contain or point to that file. In embodiments, the starting node at which the (initially single-probe) expandable set of probes 146 can search for the requested file can be the adjacent or closest node in a clockwise direction in the hash structure 144. In embodiments, other starting nodes, and other positions in the hash structure 144 can be used.

In 616, the file management module 142 can determine whether the requested file is located within, and/or can be located by following direct or indirect links, within the expandable set of probes 146. In 618, if the requested file is not found directly or by referenced links within the first or initial set of probes in the expandable set of probes 146, the file management module 142 can generate one or more further generations of the expandable set of probes 146 until the requested file is located and/or verified to be found and up to date. In aspects, the starting node at which the first probe of the expandable set of probes 146 is aligned can be incremented in each generation of that expandable set of probes 146 that is generated, so that the span of each generation of those probes begins at the next unexamined or adjacent node. In aspects, the starting node to which the expandable set of probes 146 is aligned can be incremented or can progress in a clockwise direction in a consistent hashing scheme, but, in embodiments, can traverse the hash structure 144 in a counter-clockwise direction, and/or can move in other ways or following other patterns.

In 620, the file management module 142 can extract or retrieve the requested file and/or update the set of nodes 150 to reflect the location at which the requested file was ultimately found, such as by storing the file itself in a corresponding node in the set of nodes 150, by storing a link to the file in the set of nodes 150, and/or otherwise recording the location of the requested file. In 622, the file management module 142 can return a notification and/or take other action if the requested file is not located after exhausting the set of nodes 150 of the hash structure 144, and/or based on other conditions, as appropriate. In 624, processing can repeat, return to a prior processing point, jump to a further processing point, or end.

The foregoing description is illustrative, and variations in configuration and implementation may occur to persons skilled in the art. For example, while embodiments have been described which operate using one file management module 142 and associated cloud management system 104, in embodiments, one or more of file management module 142 and associated cloud management system 104, and/or other servers, data stores, and/or other logic or resources can be used. For further example, while embodiments have been described in which cloud resources and subscription plans are modified or adjusted, in embodiments, the subscription plans, associated fees, and resources associated with the plans can be modified or adjusted according to any combination and at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:

initiating, by a processor of a centralized server of a cloud management system, a search for a file stored in a cloud-based network, the search based on a plurality of nodes in a hash structure storing a plurality of file links, wherein the search is initiated at a first starting node of the hash structure;

searching, by the processor of the cloud management system, a first subset of the plurality of nodes to find the file using a first iteration of an expandable set of probes spanning the first subset of the plurality of nodes, starting at the first starting node, wherein the searching the first subset of the plurality of nodes using the first iteration of the expandable set of probes comprises transmitting a respective probe to a respective target node of the first subset of the plurality of nodes to locate the file at the respective target node; and upon not finding the file in the first subset of the plurality of nodes by the first iteration of the expandable set of probes, performing, by the processor of the cloud management system, an expanded search comprising:

expanding the expandable set of probes from a first number of probes in the first iteration to a second number of probes in a second iteration spanning a second subset of the plurality of nodes that is at least double the number of the first subset of the plurality of nodes, wherein the second number of probes in the expandable set of probes in the second iteration is based on a function applied to the first number of probes in the expandable set in the first iteration, and searching, by the processor of the cloud management system, the second subset of the plurality of probes to find the file using the second iteration of the expandable set of probes spanning the second subset starting at a second starting node, wherein the searching the second subset of the plurality of nodes using the second iteration of the expandable set of probes comprises transmitting a first probe to a first target node of the second subset while concurrently transmitting a second probe to a second target node of the second subset to locate the file at the first target node or the second target node, wherein the second starting node is determined by incrementing by one position in the hash structure from a last node of the first subset of the plurality of nodes.

2. The method of claim 1, wherein the hash structure comprises a consistent hash ring.

3. The method of claim 1, wherein the first starting node comprises a node incremented by one position in the hash structure from an original node storing a last known valid link to the file.

4. The method of claim 1, further comprising repeating performing the expanded search if the file is not found.

5. The method of claim 4, further comprising terminating the repetition of performing the expanded search if a last node of the hash structure is reached without locating the file.

6. The method of claim 4, wherein the span of the expandable set of probes is at least doubled for each repetition of performing the expanded search.

7. The method of claim 1, wherein the initiating the search comprises initiating the search after following a plurality of original links to the file stored in the hash structure fails to locate the file.

8. The method of claim 1, further comprising inserting a link in the plurality of file links to the file when located in the second subset of the plurality of nodes.

9. The method of claim 1, wherein the first subset of the plurality of nodes comprises one node.

10. The method of claim 1, further comprising:
upon finding the file in the first subset of the plurality of nodes, accessing the file.

11. A system comprising:
an interface to a plurality of storage resources in at least one cloud network; and
a processor of a centralized server, to communicate with the plurality of storage resources in the at least one cloud network via the interface, the processor to:
initiate a search for a file based on a plurality of nodes in a hash structure storing a plurality of file links to a plurality of locations in the plurality of storage resources, at a first starting node of the hash structure,
search a first subset of the plurality of nodes to find the file using a first iteration of an expandable set of probes spanning the first subset of the plurality of nodes, starting at the first starting node, the processor to search the first subset is to transmit a respective probe to a respective target node of the first subset of the plurality of nodes to locate the file at the respective target node, and
upon not finding the file in the first subset of the plurality of nodes by the first iteration of the expandable set of probes, perform an expanded search, the expanded search comprising:
expanding the expandable set of probes from a first number of probes in the first iteration to a second number of probes in a second iteration spanning a second subset of the plurality of nodes that is at least double the number of the first subset of the plurality of nodes, wherein the second number of probes in the expandable set of probes in the second iteration is based on a function applied to the first number of probes in the expandable set in the first iteration, and
searching the second subset of the plurality of probes to find the file using the second iteration of the expandable set of probes spanning the second subset starting at a second starting node, wherein the searching the second subset of the plurality of nodes using the second iteration of the expandable set of probes comprises transmitting a first probe to a first target node of the second subset while concurrently transmitting a second probe to a second target node of the second subset to locate the file at the first target node or the second target node, wherein the second starting node is determined by incrementing by one position in the hash structure from a last node of the first subset of the plurality of nodes.

12. The system of claim 11, wherein the hash structure comprises a consistent hash ring.

13. The system of claim 11, wherein the first starting node comprises a node incremented by one position in the hash structure from an original node storing a last known valid link to the file.

14. The system of claim 11, wherein the processor is further to repeat performing the expanded search if the file is not found.

15. The system of claim 14, wherein the processor is further to terminate the repetition of performing the expanded search if a last node of the hash structure is reached without locating the file.

16. The system of claim 14, wherein the span of the expandable set of probes is at least doubled for each repetition of performing the expanded search.

17. The system of claim 11, wherein the processor is to initiate the search after following a plurality of original links to the file stored in the hash structure fails to locate the file.

18. The system of claim 11, wherein the processor is further to insert a link in the plurality of file links to the file when located in the subset of the plurality of nodes.

19. The system of claim 11, wherein the first subset of the plurality of nodes comprises one node.

20. A non-transitory computer readable storage medium having instructions that, when executed by a processor of a centralized server of a cloud management system, cause the processor to:
initiate, by the processor of the centralized server of the cloud management system, a search for a file stored in a cloud-based network, the search based on a plurality of nodes in a hash structure storing a plurality of file links, wherein the search is initiated at a first starting node of the hash structure;
search, by the processor of the cloud management system, a first subset of the plurality of nodes to find the file using a first iteration of an expandable set of probes spanning the first subset of the plurality of nodes, starting at the first starting node, the processor to search the first subset is to transmit a respective probe to a respective target node of the first subset of the plurality of nodes to locate the file at the respective target node; and
upon not finding the file in the first subset of the plurality of nodes by the first iteration of the expandable set of probes, perform, by the processor, an expanded search, wherein the processor is to:
identify a second starting node in the hash structure,
expand the expandable set of probes from a first number of probes in the first iteration to a second number of probes in a second iteration spanning a second subset of the plurality of nodes that is greater than at least double the number of the first subset of the plurality of nodes, wherein the second number of probes in the expandable set of probes in the second iteration is based on a function applied to the first number of probes in the expandable set in the first iteration, and
search the second subset of the plurality of probes to find the file using the second iteration of the expandable set of probes spanning the second subset starting at a second starting node, wherein the processor to search the second subset is to transmit a first probe to a first target node of the second subset and concurrently transmit a second probe to a second target node of the second subset to locate the file at the first target node or the second target node, wherein the second starting node is determined by incrementing by one position in the hash structure from a last node of the first subset of the plurality of nodes.

21. The non-transitory computer readable storage medium of claim 20, wherein the first starting node comprises a node incremented by one position in the hash structure from an original node storing a last known valid link to the file.

22. The non-transitory computer readable storage medium of claim 20, wherein the processor is further to repeat performing the expanded search if the file is not found.

23. The non-transitory computer readable storage medium of claim 20, wherein the span of the expandable set of probes is at least doubled for each repetition of performing the expanded search.

* * * * *